United States Patent [19]

Scheuneman et al.

[11] Patent Number: 4,918,695
[45] Date of Patent: Apr. 17, 1990

[54] FAILURE DETECTION FOR PARTIAL WRITE OPERATIONS FOR MEMORIES

[75] Inventors: James H. Scheuneman, St. Paul; Michael E. Mayer, Fridley; Paul L. Peirson, Forest Lake, all of Minn.

[73] Assignee: Unisys Corporation, Blue Bell, Pa.

[21] Appl. No.: 238,083

[22] Filed: Aug. 30, 1988

[51] Int. Cl.$^4$ .............................................. G06F 11/10
[52] U.S. Cl. ..................................... 371/51.1; 371/40.1
[58] Field of Search ...................... 371/51, 49, 38, 40.1, 371/51.1; 364/200 MS File, 900 MS File

[56] References Cited

U.S. PATENT DOCUMENTS

| | | | |
|---|---|---|---|
| 3,863,217 | 1/1975 | Taylor | 371/51 |
| 4,072,853 | 2/1978 | Barlow et al. | 371/51 |
| 4,077,028 | 2/1978 | Lui et al. | 371/38 |
| 4,157,586 | 6/1979 | Gannon et al. | 364/200 |
| 4,520,439 | 5/1985 | Liepa | 364/200 |

Primary Examiner—Charles E. Atkinson
Attorney, Agent, or Firm—Glenn W. Bowen; Robert S. Bramson

[57] ABSTRACT

A failure detection system for variable field partial write system for merging data bits in a memory word upon programmable request is described. The variable bit field can be selected for any number of bit positions from a single bit up to and including a full data word, where data words are comprised of a predetermined number of bytes each containing a predetermined number of bits. A Start Bit Code defines the location of the start of the bit field to be written and an End Bit Code defines the bit after the last bit that is to be merged and written. Write and Read Data to be used in the partial merge operation are stored in a Merge Register along with a code derived from the Start and End Code bits. The bits not used are stored in a Non-Merge Register. Parities are compared to verify that a parity error did not occur when the Merge Register was loaded.

16 Claims, 2 Drawing Sheets

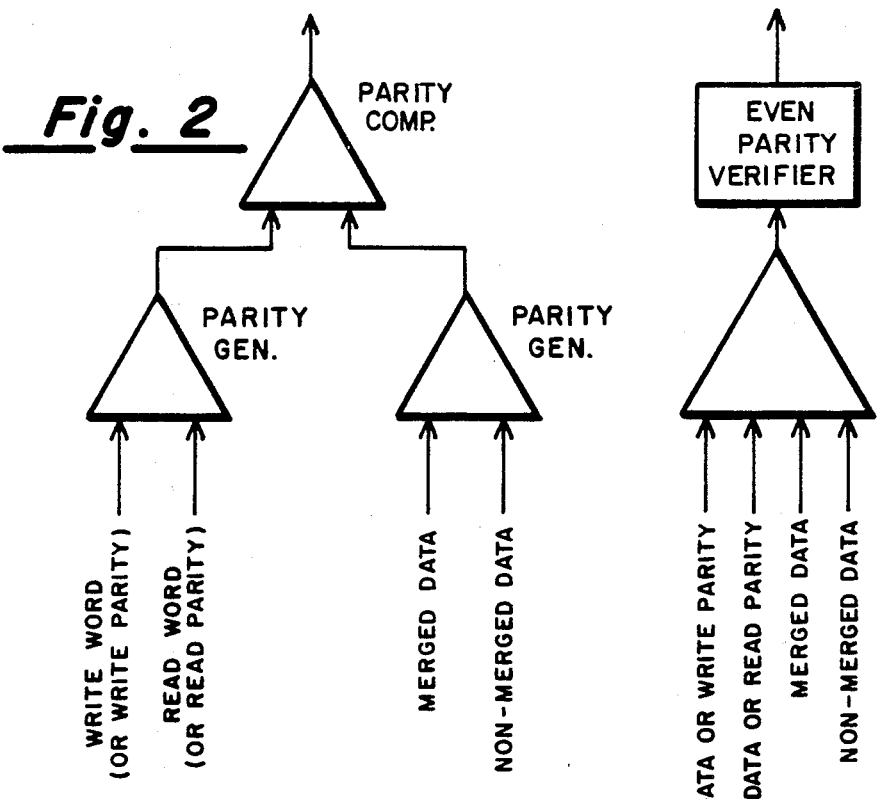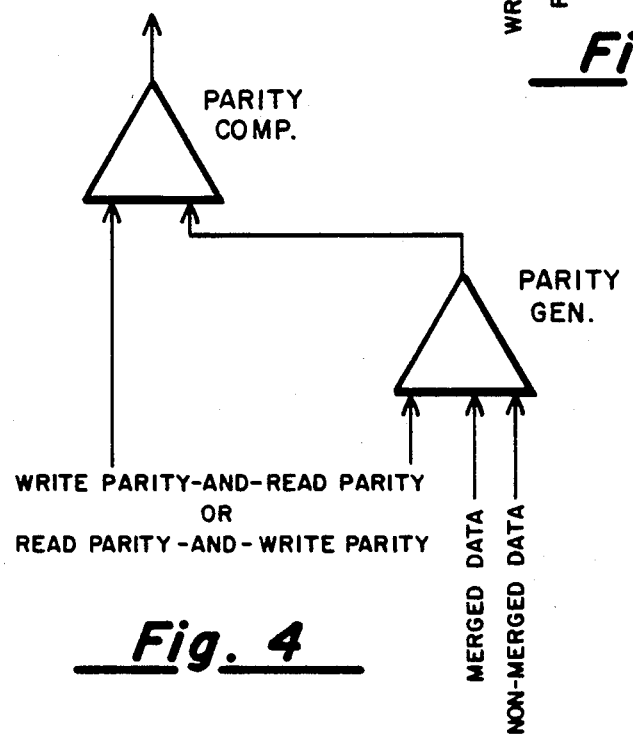

FAILURE DETECTION FOR PARTIAL WRITE OPERATIONS FOR MEMORIES

BACKGROUND OF THE INVENTION

1. Field of the Invention

The present invention is in the field of error detection for memories of data processing systems, and, in particular, it relates to error detection for partial write operations of such memories.

2. General Description of the Prior Art

It has been a consistent goal in data processing to achieve faster and faster computing rates. Coupled with this goal of faster computing rates is a parallel goal of providing system architecture that provides for general purpose computing operations. In the past, it has been common for data processing systems to have system architectures that are designed for a fixed data word length. Often, the data word length is selected to be compatible with the data word storage register capacity of the main memory system. For example, if 36-memory registers are employed, it was common to have the data processing system also function on a 36-bit basis.

At a relatively early time in the development of binary computing systems, it was recognized that a more efficient utilization of the main memory could be accomplished by providing for half-word access to the main memory system for reading and writing operations. Such systems usually were operated on a whole-word basis in arithmetic operations, even though access could be made to the memory on a half-word basis.

As system architecture and memory systems were further improved and refined, systems were developed that permitted access for reading and writing in the main memory selectively on the basis of quarter-words, third-words, as well as half-words on a fixed bit-arrangement basis. These binary data processing systems were normally arranged with the memory register capacity being fixed at some multiple of two power, these fractional arrangements were relatively easy to define and implement. In U.S. Pat. No. 4,520,439 issued May 28, 1985, in the name of Arnolds E. Liepa, which is assigned to the assignee of the present invention, provision was made for providing the capability of writing variable length bit-fields, where the bit-field length could vary anywhere from a single bit to the full memory word.

Many logical and data manipulative operations now require the ability to read and write various variable length bit-fields. Such operations are often accomplished by logical instructions coupled with shifting of data words to accomplish the insertion of variable bit-fields in data words to be recorded. Checking of the operation of the partial write function in such systems is vital. Although parity and check bits are generated for merged data and stoed in memory in prior partial write operations, it is possible in such systems to drop or pick up a "1" bit during merging and not detect the error. The present invention provides for the detection of merging errors in order to minimize the occurrence of undetected errors.

SUMMARY OF THE INVENTION

The present invention is for an error detection and correction portion of a memory system which is used when error corrected read data and write data are merged under the control of a start code and an end code. The start code defines a starting bit of the read data, and the end code defines the end bit of the read data which is to be overwritten with the write data. A decoding means receives and decodes the start code and the end code and supplies decoded selector bits to a merge register, and the bit-by-bit complement of the decoded selector bits to a non-merge register. Parity generating and checking means are coupled to the merge register, the non-merge register to a write data parity bit transmitter and to a read data parity bit transmitter in order to generate a total parity bit. A comparer compares the total parity bit to detect if an error has occurred.

BRIEF DESCRIPTION OF THE DRAWING

FIGS. 2-4 represent partial block diagrams of alternate versions of the present invention.

DESCRIPTION OF THE PREFERRED EMBODIMENT

Figure 1:
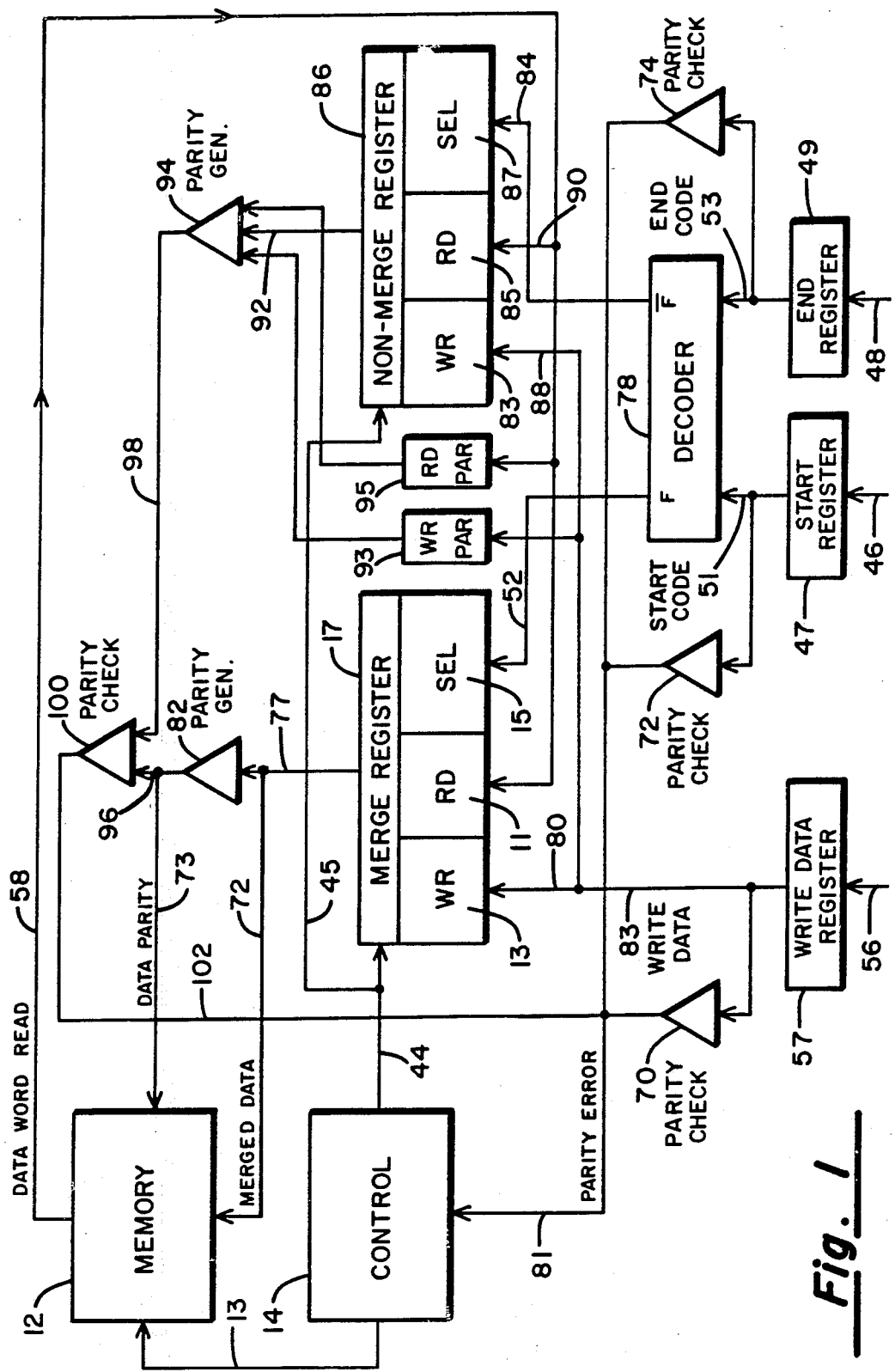
FIG. 1 represents a block diagram of the partial write error detection system of the present invention.

FIG. 1 illustrates a block diagram of a portion of a data processor which incorporates the variable field partial write error detection feature of the present invention. The Memory 12 includes an array of addressable memory cells together with the necessary associated addressing and accessing circuitry, which is not shown in detail, since such circuitry may conform to well known circuit design techniques. The Memory 12 functions to store instruction words and operand words, which are collectively referred herein as "data words." Control Section 14 operates in a conventional manner through signals on the Bus 13 to control reading operations or writing operations requested by the elements (not shown) of the data processing system, and to correlate the timing for reading and writing operations in the Memory 12. It should be understood that there may be more than one data processor or requestor in the data processing system operating under the supervision of the Control Section 14. In the event that more than one requestor is utilized, a priority arrangement must be utilized.

The Control Section 14 first issues a Read Request when a data word stored in the memory is required for a Partial Write operation. When the error-corrected data word is called from memory, it is supplied on the Bus 58 and is stored in a Read Section 11 of Merge Register 17. The Merge Register 17 is controlled by signals on the Bus 44 from the Control Section 14. A Write Data word is then provided on the Bus 56 for storage in the Write Data Register 57. Register 57 supplies the Write word to the Write Section 13 of the Merge Register 17 via Bus 13 and Bus 80. The requesting processor also specifies the Start Bit position of the variable field that is to be written by a coded signal on Bus 46, and the End Bit, or the last bit to be written in the variable field, by a coded signal on Bus 48. This information is stored in the Start Register 47 and the End Register 49, respectively, and is supplied as Start and End codes to the Decoder 78 over the Buses 51, 53, respectively.

Mask signals are generated by the Decoder 78 and are transmitted on Bus 52 for storage in the Selection Section 15. These signals define the bit positions in the memory address registers that will be altered during the Partial Write operation. The Read Data word stored in the Read Section 11 is merged with the Write Data word in the Write Section 13 under the control of the Selection Section 15 to form a Merged Data word. The Merged Data word is transmitted to the Memory 12 via the Buses 77 and 72.

The Write Data in the Write Data Register 57, the Start Code in the Start Register 47 and the End Code in the End Register 49 are all preferably subjected to parity checks by the Parity Check Circuits 70, 72 and 74, respectively, which are connected to the input Bus 81 to the Control Section 14. This minimizes the transmission of errors into the Merge Register 17 and the Decoder 78. The selection lines 52 for supplying the Mask Merge Code to the Merge Register 17 is labeled "F" to specify the Merge Code function bits. The Merged Data word from the Merge Register 17 is supplied to a Parity Generator 82, where parity of the Merged Data Word is checked to determine if the parity is even or odd parity. The parity from the Parity Generator 82 may be stored via line 73 in Memory 12.

The portion of the system described thus far corresponds generally to known techniques for partial write merge field generation and verification. The remainder of this description is directed to the improvement of the present invention which adds additional verification capability, which in combination with the previously described elements provides a system with enhanced reliability and verification capabilities.

The Decoder 78 of the described embodiment, in addition to providing the F or Merge Mask Code, also develops and supplies the bit-by bit complement $\overline{F}$ or Selection Code of the F code. This complemented Non-Merge Selection Code which is labelled "$\overline{F}$" is supplied on the Bus 84 to the Selection Section 87 of the Non-Merge Register 86, which is controlled by the Control Section 14 through signals supplied on Bus 45. (Alternately, the F code may be supplied and complemented in the Non-Merge Register 86 or elsewhere. The location at which the $\overline{F}$ code is produced is not critical to the invention. Write and Read Data Words are supplied on the Buses 88 and 90 to the Write Section 83 and the Read Section 85 of the Non-Merge Register 86. The output of the Non-Merge Register 86 on the Bus 92 is a word which consists of the Read bits of the error-corrected word that was read from memory, but which were written over by write word bits in the Merge Register 17, plus the Write Word bits which were supplied to the Write Data Register 87 which were not used to write over any read bits in error-corrected Read Word. This word is termed the Non-Merged Data Word and is stored in the Non-Merge Register 86. The Parity Generator 94 receives the 36 bits of Non-Merged Data Word, the Write Parity Bit and Read Parity Bit and generates a parity bit representative of these combined bits. The Write Parity Bit is sent to the Parity Generator 94 by the Write Parity Register 93, and the Read Parity Bit is transmitted to the Write Parity Generator 94 by the Read Parity Register 95. The Write and Read Parity Bits are supplied on the Buses 56 and 58, respectively. The parity bit for the complemented merged data and the parity bit for the merge data are then supplied on the Buses 96, 98, respectively, to the Parity Checker 100 to verify that the two parities compare, or to produce an Error Signal on the line 102 if they do not compare.

An alternate version of this invention may be implemented by comparing the parity generated from the Write and Read data words, or from Write and Read parity bits, with the parity generated by a parity generator coupled to receive the Merged Data Word and the Non-Merged Data Word, as illustrated in FIG. 2. A further embodiment can be implemented, as shown by FIG. 3, by sending either the Write and Read data words or Write and Read parity bits the Merged Data Word and the Non-Merged Data Word all to single parity Generator, and by verifying that the correct parity output results. Another embodiment can be constructed by coupling the Merged Data Word and the Non-Merged Data Word to a parity generator, as shown in FIG. 4. If a third input of the parity generator then receives a read word parity bit, the resulting parity is compared with the Write Word parity bit, and if the third input receives a Write Word parity bit, the resulting parity is compared with the read parity bit.

The parity generated by the parity generators 82 and 94 may be 1-bit word parity or may be a 4-bit byte parity, as desired. The implemented parity generator and comparing technique relies on the relationships of the Write Parity, the Read Parity, the parity of the Merged Data Word and the parity of the Non-Merged Data Word.

When the Write and Read parities are opposite (i.e., one is odd and the other is even) the correct parity of the Merged Data Word and the Non-Merged Data Word will also be related so that one will be odd and the other will be even. On the other hand, when the Write and Read parities are either both odd or both even, the correct parities of the Merged Data Word and the Non-Merged Data Word will be either both odd or both even. In addition, in this case the Write and Read parities will be of the opposite parity from the Merged Data Word and the Non-Merged Data Word parity. This is illustrated in the following 9-bit word examples assuming odd parity for the machine. Thus if a word has an even parity (an even number of "1" bits) the "1" parity bit will be generated for that word. If a word has odd parity (an odd number of "1" bits) a "0" parity bit occurs for that word.

EXAMPLE 1

|  |  |  |  | Octal Value | Decimal Value |
|---|---|---|---|---|---|
| Read Word | 110 | 001 | 111 | 617 | 399 |
| Write Word | 001 | 110 | 101 | 165 | 117 |
| Read Parity Bit | 1 |  |  |  |  |
| Write Parity Bit | 0 |  |  |  |  |
| Merged Word | 110 | 110 | 111 | 667 | 439 |
| Non-Merged Word | 001 | 001 | 101 | 115 | 077 |
| Merged Word Parity Bit | 0 |  |  |  |  |
| Non-Merged Word Parity Bit | 1 |  |  |  |  |
| Parity Generator 94 Output | 1 |  |  |  |  |
| Parity Generator 82 Output | 1 |  |  |  |  |

EXAMPLE 2

| Read Word | 110 | 001 | 110 |
|---|---|---|---|
| Write Word | 001 | 110 | 101 |
| Read Parity Bit | 0 |  |  |
| Write Parity Bit | 0 |  |  |
| Merged Word | 110 | 110 | 110 |
| Non-Merged Word | 001 | 001 | 101 |
| Merged Word Parity Bit | 1 |  |  |
| Non-Merged Word Parity Bit | 1 |  |  |
| Parity Generator 94 Output | 0 |  |  |

| -continued | |
|---|---|
| Parity Generator 82 Output | 0 |

EXAMPLE 3

| Read Word | 000 | 000 | 000 |
|---|---|---|---|
| Write Word | 111 | 111 | 111 |
| Read Parity Bit | 1 | | |
| Write Parity Bit | 0 | | |
| Merged Word | 111 | 000 | 000 |
| Non-Merged Word | 000 | 111 | 111 |
| Merged Word Parity Bit | 0 | | |
| Non-Merged Parity Bit | 1 | | |
| Parity Generator 94 Output | 0 | | |
| Parity Generator 82 Output | 0 | | |

The Write Parity Transmitter 93 and the Read Parity Transmitter 95 could alternately both be coupled to the Parity Generator 82 instead of the Parity Generator 94. For another alternate embodiment, a still further embodiment is provided by coupling the Write Data Word and the Read Data Word to the Parity Generator 82 instead of the Parity Generator 94.

It is noted that while various embodiments have been disclosed and shown in FIGS. 2-4, other variations that come within the scope of the claims will be apparent to those skilled in the art. The sum of the Write and Read Words in an appropriate numerical system (e.g., octal, decimal, etc.) should be equal to the sum of the positive numerical value of the Merged and Non-Merged Data Words. In other words, for each corresponding set of Write Data, Read Data, Merged Data and Non-Merged Data Words, two of such words should have even parity and two should have odd parity or else all four words should be of either odd or even parity. Thus, various alternates not specifically shown may be devised that are within the teaching of the present invention and the scope of the appended claims.

We claim:

1. In a memory system capable of partial write operation comprising error detection means and partial write means for merging error-corrected read data and write data under the control of a start code and an end code, which respectively define the starting bit of said read data and the end bit of said read data which is to be overwritten with said write data, the improvement comprising decode means which receives and decodes said start code and said end code for producing a selection code and the bit-by-bit complement of such selection code, merge means coupled to said decode means which utilizes said read data, said write data, and said selection code, non-merge means coupled to said decode means which utilizes said read data, said write data and said bit-by-bit complement of said selection code, and parity generating and checking means coupled to both said merge means and said non-merge means for checking partial write operations.

2. In a memory system as claimed in claim 1 the improvement wherein said parity generator and checking means comprises a first parity generator means coupled to receive a merged data word and a corresponding non-merged data word.

3. In a memory system as claimed in claim 2 the improvement wherein write and read parity bits are coupled to said first parity generator means.

4. In a memory system as claimed in claim 2 the improvement wherein write data and read data words are coupled to said first parity generator means.

5. In a memory system as claimed in claim 2 the improvement comprising second parity generator means coupled to receive write and read parity bits and parity comparator means coupled to said first and second parity generator means.

6. In a memory system as claimed in claim 2 the improvement comprising second parity generator means coupled to receive write and read data words and parity comparator means coupled to said first and second parity generator means.

7. In a memory system as claimed in claim 2 wherein said merged data word, said non-merged data word and bits representative of either data word of said write data or said read data words are supplied to said first parity generator means, comprising parity comparator means which is coupled to said first parity generator means and to receive bits representative of the other data word of said write data or said read data words which was not coupled to said first parity generator means.

8. In a memory system as claimed in claim 2 the improvement wherein said parity generator and checking means comprises second parity generator means, said merged data word is coupled to one of said first and second parity generator means and said non-merged data word is coupled to the other of said first and second parity generator means and all of said bits representative of said write and said read data words are sent to the same one of said first and second parity generator means, and parity comparator means for comparing said first and second parity generator means.

9. A method of detecting errors in a memory system that comprises partial write means for merging read data and write data under the control of a start code and an end code, which respectively define the starting bit of said read data and the end bit of said read data which is to be overwritten with said write data, and decode means which receives and decodes said start code and said end code, comprising generating a non-merged data word and then generating a parity check utilizing the corresponding merged data word, said non-merged data word and bits representative of corresponding write word and read words to check said partial write operations.

10. A method as claimed in claim 9 comprising generating a first parity for said merged data word, generating a second parity for said non-merged data, a write parity bit representative of said write word, and a read parity bit representative of said read word and comparing said first and second parities.

11. A method as claimed in claim 9 comprising generating first parity for a write parity bit representative of said write word and a read bit representative of said read word and a second parity for said merged data word and a non-merged data word and comparing said first and second parities.

12. A method as claimed in claim 9 comprising generating a first parity for said write word and said read word and a second parity for said merged data word and a non-merged data word and comparing said first and second parities.

13. A method as claimed in claim 9 comprising generating a combined parity for write parity bit representative of of said write word, a read parity bit representative of said read word, said merged data word and said non-merged data word.

14. A method as claimed in claim 9 comprising generating a combined parity for said write word, said read word, said merged data word and a non-merged data word and comparing said first and second parities.

15. A method as claimed in claim 9 comprising generating a first parity that utilizes said merged data word, a second parity that utilizes said corresponding non-merged data words wherein one of said first and second parities also utilize bits representative of said write and read data words and comparing said first and second parities.

16. A method as claimed in claim 9 comprising generating a first parity that utilized said merged data word, said non-merged data word and bits representative of the parity of either data word of said write data or said read data words and comparing said first parity with bits representative of the parity of the other data word of said write data of said read data words which was not utilized in generating said first parity.

* * * * *